United States Patent
Yavuz et al.

(10) Patent No.: US 11,350,347 B2
(45) Date of Patent: May 31, 2022

(54) NETWORK NODE, WIRELESS DEVICE AND METHODS THEREIN IN A COMMUNICATIONS NETWORK

(71) Applicant: Telefonaktiebolaget LM Ericsson (publ), Stockholm (SE)

(72) Inventors: Emre Yavuz, Stockholm (SE); Johan Bergman, Stockholm (SE); Karin Hedén, Sundbyberg (SE); Antti Ratilainen, Espoo (FI); Yutao Sui, Solna (SE); Tuomas Tirronen, Helsinki (FI); Stefan Wänstedt, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 198 days.

(21) Appl. No.: 15/759,538

(22) PCT Filed: Nov. 1, 2017

(86) PCT No.: PCT/SE2017/051076
§ 371 (c)(1),
(2) Date: Mar. 13, 2018

(87) PCT Pub. No.: WO2018/084785
PCT Pub. Date: May 11, 2018

(65) Prior Publication Data
US 2020/0008130 A1      Jan. 2, 2020

Related U.S. Application Data

(60) Provisional application No. 62/417,381, filed on Nov. 4, 2016.

(51) Int. Cl.
*H04W 48/10* (2009.01)
*H04L 5/00* (2006.01)
(Continued)

(52) U.S. Cl.
CPC ............ *H04W 48/10* (2013.01); *H04L 5/0053* (2013.01); *H04L 5/0096* (2013.01); *H04W 4/06* (2013.01);
(Continued)

(58) Field of Classification Search
CPC ...... H04W 48/10; H04W 48/12; H04W 48/16; H04W 72/042; H04W 4/06; H04L 5/0053; H04L 5/0096
See application file for complete search history.

(56) References Cited

U.S. PATENT DOCUMENTS

2013/0215761 A1* 8/2013 Xu ................. H04W 48/12 370/241
2014/0086173 A1* 3/2014 Sadeghi ............. H04L 5/003 370/329
(Continued)

FOREIGN PATENT DOCUMENTS

CN      108781346 A      11/2018
WO   2017222467 A1      12/2017

OTHER PUBLICATIONS

Unknown, Author, "Discussion on multicast support for Rel-14 NB-IoT", 3GPP TSG RAN WG1 Meeting #86bis, R1-1610027, NTT Docomo, Lisbon, Portugal, 3 pages.
(Continued)

*Primary Examiner* — Christopher P Grey
(74) *Attorney, Agent, or Firm* — Murphy, Bilak & Homiller, PLLC

(57) ABSTRACT

A network node (110), a wireless device (120) and methods therein, for enabling the wireless device (120) to obtain configuration information from a multicast control channel, e.g. SC-MCCH, which is transmitted by the network node (110). The network node (110) transmits an indication of change of the multicast control channel, wherein the indication further indicates whether the wireless device (120) is
(Continued)

affected by the change and needs to acquire or obtain the multicast control channel or not. The network node (110) further transmits the multicast control channel as changed according to said indication. Thereby, the wireless device (120) can decide to obtain and acquire the multicast control channel only if it is affected by the change and to refrain when not affected, which will reduce the consumption of energy in the wireless device (120).

25 Claims, 9 Drawing Sheets

(51) Int. Cl.
*H04W 4/06* (2009.01)
*H04W 48/12* (2009.01)
*H04W 48/16* (2009.01)
*H04W 72/04* (2009.01)

(52) U.S. Cl.
CPC ........... *H04W 48/12* (2013.01); *H04W 48/16* (2013.01); *H04W 72/042* (2013.01)

(56) References Cited

U.S. PATENT DOCUMENTS

| | | | |
|---|---|---|---|
| 2017/0302465 A1* | 10/2017 | Wang | H04W 76/20 |
| 2018/0249442 A1* | 8/2018 | Xu | H04W 4/06 |
| 2019/0174529 A1* | 6/2019 | Tie | H04W 68/005 |
| 2019/0182802 A1* | 6/2019 | Yu | H04W 72/1289 |
| 2019/0223197 A1* | 7/2019 | Shin | H04L 5/0048 |
| 2019/0246254 A1* | 8/2019 | Chatterjee | H04L 1/0061 |
| 2020/0037287 A1* | 1/2020 | Zhang | H04W 72/12 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.1.0, Mar. 2016, 1-85.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.1.0, Mar. 2016, 1-551.

Unknown, Author, "Discussion on NPDCCH search space for multicast in NB-IoT", 3GPP TSG RAN WG1 Meeting #86bis, R1-1608614, Lisbon, Portugal, Oct. 10-14, 2016, 1-5.

Unknown, Author, "RAN1 agreements for Rel-13 NB-IoT", Ericsson, 3GPP TSG-RAN WG1 Meeting #84, R1-161548, St. Julian's, Malta, Feb. 15-19, 2106, 1-11.

Unknown, Author, "SC-MCCH scheduling and change notification", 3GPP TSG-RAN WG2 Meeting#95bis, R2-166127, Kaohsiung, Oct. 10-14, 2016, 1-7.

Unknown, Author, "SC-MCCH Scheduling and Update Notification in NB-IoT", 3GPP TSG-RAN WG2 Meeting #95bis, R2-166317, Kaohsiung, Oct. 10-14, 2016, 1-4.

Unknown, Author, "WF on search space for NBIoT SC-PTM", 3GPP TSG RAN WG1 Meeting #86bis, R1-1610968, Lisbon, Portugal, Oct. 10-14, 2016, 1-4.

"NB-IoT—NB-PBCH design", 3GPP TSG-RAN1 #84, R1-160259, Ericsson, St Julian's Malta, Feb. 15-19, 2016, 4 pages.

* cited by examiner

NETWORK NODE, WIRELESS DEVICE AND METHODS THEREIN IN A COMMUNICATIONS NETWORK

TECHNICAL FIELD

The present disclosure relates generally to a network node, a wireless device and methods therein, for enabling the wireless device to obtain configuration information from a multicast control channel transmitted by the network node.

BACKGROUND

In a typical wireless communication network, wireless devices, also known as wireless communication devices, mobile stations, stations (STA) and/or user equipments (UE), communicate via a Radio Access Network (RAN) to one or more core networks (CN) of a wireless network. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

In this disclosure, the term "wireless device" is used to represent any communication entity capable of radio communication with a wireless network, such as a RAN, by sending and receiving radio signals. For example, the wireless device described herein may be a mobile telephone, a tablet, a laptop computer and/or a Machine-to-Machine, M2M, device, also known as Machine Type Communication, MTC, device. Another common generic term in this field is "User Equipment, UE" which is frequently used herein as a synonym for wireless device.

Further, the term "network node", is used herein to represent any node of a wireless network, such as a RAN, that is operative to communicate with a wireless device over a radio interface and to transmit information in various channels. The network node in this disclosure may refer to a base station, radio node, Node B, base transceiver station, access point, etc., which communicates radio signals with the wireless device.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for the above, the E-UTRAN specification defines a direct interface between the radio network nodes, this interface being denoted the X2 interface. EPS denotes the Evolved 3GPP Packet Switched domain.

There has been much work in 3GPP lately on specifying technologies to handle and support Machine-to-Machine (M2M) and/or Internet of Things (IoT) related use cases. Most recent work for 3GPP Release 13 includes enhancements to support Machine-Type Communications (MTC) with a new UE category M1 (Cat-M1), supporting reduced bandwidth of up to 6 Physical Resource Blocks (PRBs), and Narrowband IoT (NB-IoT) work item specifying a new radio interface (and UE category NB1, Cat-NB1).

LTE enhancements introduced in 3GPP Release 13 for MTC are here referred to as "eMTC", including, but not limited to, support for bandwidth limited UEs, Cat-M1, and support for coverage enhancements. This is to separate discussion from NB-IoT, although the supported features are similar on a general level.

There are multiple differences between "legacy" LTE and the procedures and channels defined for eMTC procedures, likewise for NB-IoT. Some important differences include a new Physical Downlink Control Channel (PDCCH), which is called MPDCCH when used in eMTC and NPDCCH when used in NB-IoT. The term "legacy LTE" thus basically indicates LTE technology developed prior to the above-mentioned LTE enhancements and eMTC procedures were introduced.

In the LTE specifications, multicast and broadcast services have been specified under Multimedia Broadcast Multicast Services (MBMS) enabling transmission of the same content to multiple UEs in a specified area at the same time.

Neither Cat-M1 nor NB-IoT UEs support MBMS at the moment, and in 3GPP Rel-14, the multicast service is currently being standardized. This is because, for many IoT use cases, multicast support would be a useful feature to employ. Example use cases may include transmission of a firmware update to a large number of sensors or other devices, or sending a specific command to a large number of actuators at the same time. Currently, such transmissions and/or commands would need to be transmitted to each receiving UE separately using unicast. However, using multicast to transmit the same transmission and/or command to a large number of UEs with a single transmission would reduce the time needed to deliver the message and the radio resources required, thus increasing spectral efficiency. The multicast services may be realized using two different transmissions schemes, MBMS Single-Frequency Network (MBSFN) and Single-Cell Point-to-Multipoint (SC-PTM).

In SC-PTM part of the configuration and control information is sent over Single-Cell Multicast Control Channel (SC-MCCH) logical channel, see 3*GPP TS* 36.321, *"Medium Access Control (MAC) protocol specification"*, v13.1.0, *March* 2016. UEs are not expected to monitor this channel continuously, but an indication of change to this information is indicated using a Radio Network Temporary Identifier denoted SC-N-RNTI, which UEs are expected to monitor, see 3*GPP TS* 36.331, *"Radio Resource Control (RRC) protocol specification"*, v13.1.0, *March* 2016.

The SC-MCCH is a logical channel defined in the MAC specification *TS* 36.321. It is transmitted over DL-SCH transport channel which in turn is transmitted using PDCCH and PDSCH physical channels in legacy LTE. For eMTC, the corresponding physical control channel is MPDCCH and for NB-IoT the corresponding physical channels would be NPDCCH and NPDSCH.

The SC-MCCH carries the SCPTMConfiguration RRC message see TS 36.331, which includes configuration information for the UEs to receive MBMS service(s) using SC-MTCH logical channel(s).

For MBSFN part of the configuration and control, information is sent over the Multicast Control Channel (MCCH). Changes are indicated using M-RNTI in this case.

At 3GPP RAN #70 meeting, a new work item named Narrowband IoT (NB-IoT) was approved. The objective in this work item is to specify a radio access for cellular internet of things (IoT) that addresses improved indoor coverage, support for massive number of low throughput devices, and is not sensitive to delay, also enabling ultra-low device cost, low device power consumption and (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current (legacy) LTE system. NB-IoT can operate with a system bandwidth of 180 kHz. When multiple carriers are configured, see R1-161548, *"RAN1 agreements for Rel-13 NB-1° T"*, *source WI rapporteur (Ericsson)*, 3*GPP TSG-RAN WG*1 *Meeting #84, St. Julian's, Malta, Feb.* 15th-19th, 2016, several 180 kHz carriers may be used, e.g., for increasing the system capacity, inter-cell interference coordination, load balancing, etc.

In order to enable certain use cases that require more capacity than usual, e.g., software or firmware upgrade of NB-IoT devices, multi-carrier operations may be used, see e.g. R1-161548. The NB-IoT devices may then listen to system information on an anchor carrier, but when there is data to receive the communication may be moved to a secondary carrier.

In the current SC-PTM transmission mode, after reading the SC-MCCH, a UE is not expected to monitor the SC-MCCH continuously. If the SCPTMConfiguration RRC message, sent over SC-MCCH, changes, an indication of change to the SC-MCCH is indicated using SC-N-RNTI, which the UE is expected to monitor. The change of SC-MCCH can only occur at the beginning of the SC-MCCH modification period. The change of SC-MCCH may occur because of a change in the currently configured SC-MCCHs or addition of a new SC-MCCH. If a UE detects the change of SC-MCCH, and if it is interested in receiving a multicast service configured by the SC-MCCH, the UE needs to read the entire SC-MCCH again.

The above mentioned way works well in LTE to indicate changes of SC-MCCH since LTE systems use relatively large bandwidth, and the UE can receive the SC-MCCH within a relatively short time. Also, LTE UEs are usually capable of monitoring several channels at the same time. But for systems like, e.g., eMTC or NB-IoT, due the coverage extension and reduced bandwidth, it usually takes relatively long time for the UE to receive the same amount of information, especially when the eMTC or NB-IoT UEs are located in poor coverage. Also, since eMTC and NB-IoT UEs are typically designed with low complexity, their ability of simultaneously decoding serval channels is very limited. This is then a problem for the above mentioned way of indicating changes of SC-MCCH.

More specifically, if an eMTC or NB-IoT UE has been configured by SC-MCCH with an ongoing SC-MTCH transmission, according to conventional procedures, upon being noticed that SC-MCCH is changed, the UE needs to read the entire SC-MCCH again, even if its own SC-MTCH configuration is not changed. Reading the SC-MCCH may take a long time, due to the reasons mentioned above. If the SC-MTCH configuration is not changed for the UE, this operation is thus performed anyway, thereby consuming energy in vain. It should be noted that one SC-MCCH may configure several SC-MTCHs in a cell.

In the procedure described in *R*1-1610968, *"WF on search space for NB-*1° *T SC-PTM"*, *source Huawei, HiSilicon, ZTE,* 3*GPP TSG RAN WG*1 *Meeting #*86*bis, Lisbon, Portugal, Oct.* 10-14, 2016, it is mentioned that SC-MCCH change notifications can be indicated in the Downlink Control Information (DCI) scheduling SC-MCCH and/or the DCI scheduling SC-MTCH, details of what is indicated and how. The UE still needs to check out these changes by reading the entire SC-MCCH after each such notification.

SUMMARY

It is an object of embodiments and examples described herein to address at least some of the problems and issues outlined above. It is possible to achieve this object and others by using a network node, a wireless device and methods therein, as defined in the attached independent claims.

According to one aspect, a method is performed by a network node in a wireless network, for enabling a wireless device to obtain configuration information from a multicast control channel, e.g. the above-mentioned SC-MCCH, transmitted by the network node. In this method, the network node transmits an indication of change of the multicast control channel, wherein the indication further indicates whether the wireless device is affected by the change and needs to acquire or obtain the multicast control channel or not. The network node further transmits the multicast control channel as changed according to said indication.

According to another aspect, a network node is arranged to enable a wireless device to obtain configuration information from a multicast control channel, e.g. the above-mentioned SC-MCCH, transmitted by the network node. The network node is configured to transmit an indication of change of the multicast control channel, wherein the indication further indicates whether the wireless device is affected by the change and needs to acquire or obtain the multicast control channel or not. The above transmitting functionality may be realized by means of a first transmitting module in the network node. The network node is further configured to transmit the multicast control channel as changed according to said indication, which functionality may be realized by means of a second transmitting module in the network node.

According to another aspect, a method is performed by a wireless device for obtaining configuration information from a multicast control channel, e.g. the above-mentioned SC-MCCH, transmitted by a network node in a wireless network. In this method, the wireless device receives an indication of change of the multicast control channel, wherein the indication further indicates whether the wireless device is affected by the change and the wireless device needs to acquire or obtain the multicast control channel or not. The wireless device then acquires or obtains the multicast control channel when said indication indicates that the wireless device is affected by the change.

According to another aspect, a wireless device is arranged to obtain configuration information from a multicast control channel, e.g. the above-mentioned SC-MCCH, transmitted by a network node in a wireless network. The wireless device is configured to receive an indication of change of the multicast control channel, wherein the indication further indicates whether the wireless device is affected by the change and the wireless device needs to acquire or obtain the multicast control channel or not. This functionality may be realized by means of a receiving module in the wireless device. The wireless device is also operable to acquire or obtain the multicast control channel when said indication indicates that the wireless device is affected by the change. The latter functionality may be realized by means of an acquiring or obtaining module in the wireless device.

Advantages that may be achieved when implementing the above network node, wireless device and methods include that the wireless device only needs to acquire or obtain the multicast control channel if the indication indicates that the wireless device is affected by the change. Thereby, the wireless device will consume less energy for monitoring the multicast control channel, as compared to the above-described known procedures.

The above network node, wireless device and methods may be configured and implemented according to different optional embodiments to accomplish further features and benefits, to be described below.

A computer program is also provided which comprises instructions which, when executed on at least one processor, cause the at least one processor to carry out either of the methods described above. A program carrier containing the above computer program is further provided, wherein the program carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Some embodiments herein may be used to provide an Enhanced SC-MCCH change notification for Single-point to multi-points or multicast for communications related to e.g. Machine-Type Communications, eMTC, NB-IoT, multicast, networked society, feedback, coverage enhancement, MAC, RRC.

Embodiments herein provide a more efficient way to notify a wireless device whether a change of SC-MCCH affects the wireless device, such as its current SC-MTCH(s)' configuration(s). The wireless device does not need to read the SC-MCCH again until the wireless device is affected by a change thereof, e.g. when its interested SC-MTCH(s)' configuration(s) has changed.

For example, the embodiments allow wireless devices to refrain from acquiring SC-MCCH when the changes in SC-MCCH do not affect its current SC-MTCH configuration, e.g. when the changes do not affect one or more MBMS services the wireless device is receiving by means of the SC-MTCH. In this way, power or energy consumption of the wireless device can be reduced by avoiding unnecessary acquisition of the SC-MCCH.

Figure 1:
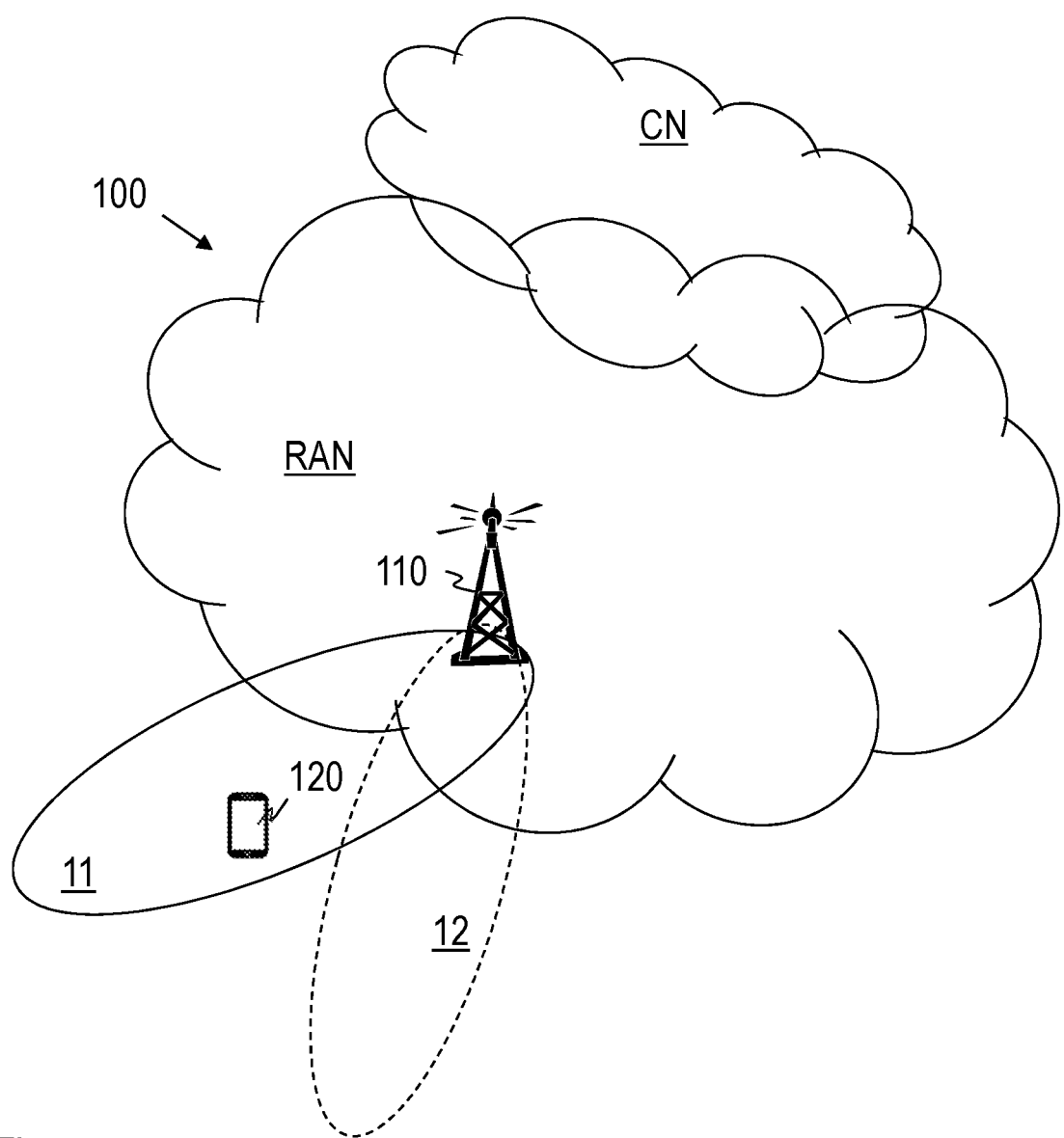
FIG. 1 is a communication scenario illustrating a wireless network where embodiments herein may be employed.

Embodiments herein can be used in a wireless network in general. FIG. 1 is a schematic overview depicting a wireless network 100. The wireless network 100 may comprise one or more RANs and one or more CNs. The wireless network 100 may use a number of different technologies, such as MTC with a new UE category M1, Cat-M1 supporting reduced bandwidth of up to 6 PRBs, and NB-IoT specifying a new radio interface and UE category NB1, Cat-NB1.

The wireless network 100 may use a further number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Embodiments herein may relate to recent technology trends that are of particular interest in a 5G context, however, the embodiments are also applicable in further development of the existing wireless communication systems such as e.g. WCDMA and LTE.

Network nodes operate in the wireless network 100 such as a network node 110. The network node 110 provides radio coverage over a geographical area 11, which may also be called a service area or a cell or a beam or a beam group where the group of beams is covering the service area of a first radio access technology (RAT), such as 5G, LTE, Wi-Fi or similar. 12 denotes another geographical area of radio coverage provided by the network node 110.

The network node 110 may be a transmission and reception point e.g. a radio access network node such as a Wireless Local Area Network (WLAN) access point or an Access Point Station (AP STA), an access controller, a base station, e.g. a radio base station such as BSS, a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective network node depending e.g. on the radio access technology and terminology used.

In the wireless network 100, UEs such as a wireless device 120, communicate via one or more Access Networks (AN), e.g. RAN, to one or more core networks (CN). It should be understood by one skilled in the art that "wireless device" is a non-limiting term which for example means any eMTC UE, Cat-M1 UE, NB-IoT UE, terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

In the following, various embodiments will be described and explained by means of some illustrative but non-limiting examples. It should be noted that these embodiments and examples are not mutually exclusive and can be combined whenever suitable. For example, components from one embodiment may be tacitly assumed to be applicable in combination with another embodiment and it will be obvious to a person skilled in the art how those components may be used in other exemplary embodiments.

Figure 2:
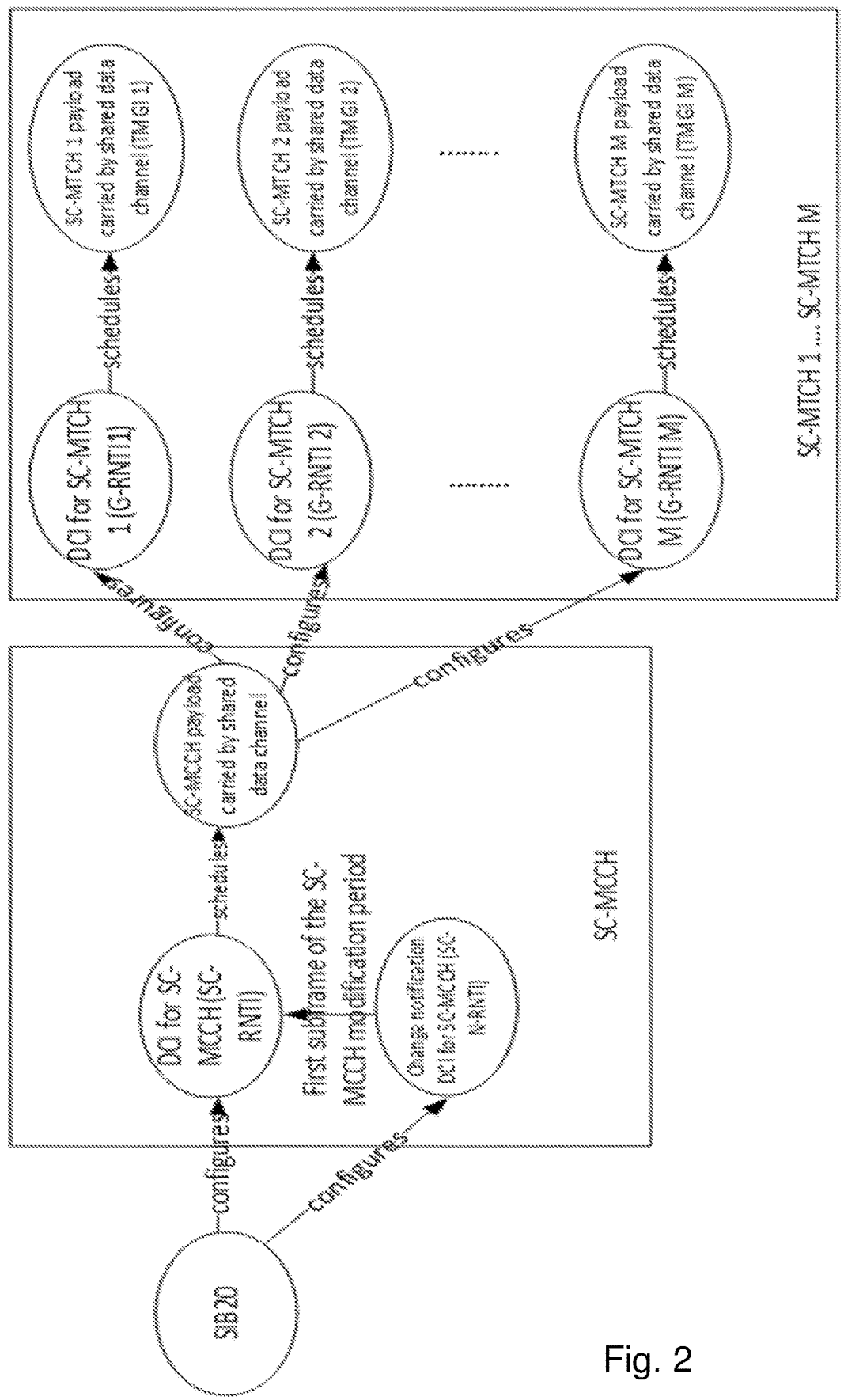
FIG. 2 is a diagram illustrating how different channel parameters may be indicated for radio communication in a legacy LTE network.

As mentioned in the background section, a SC-PTM has two important channels, i.e., SC-MCCH and SC-MTCH. FIG. 2 shows the legacy LTE Rel-13 SC-PTM work procedures. From FIG. 2 it can be seen that in a cell there is only one SC-MCCH that configures several SC-MTCHs which offers different multicast services. The payload of SC-MCCH and SC-MPTCH are carried by shared data channels, and scheduled by using Downlink Control Information (DCI). Currently, for eMTC a DCI is carried by the above-mentioned channel MPDCCH and for NB-IoT a DCI is carried by the above-mentioned channel NPDCCH. The DCI format used for eMTC and NB-IOT SC-PTM has presently not been decided in 3GPP.

Due to a difference between LTE and eMTC/NB-IoT systems, it is agreed in "*DRAFT Report from the IoT breakout sessions,* 3*GPP RAN2 Meeting #95bis, Kaohsiung, Taiwan, Oct.* 10-14, 2016" that" RAN2 assumes that direct Indication or similar mechanism, that provides information in DCI, may be used for SC-MCCH change notification. Therefore, the legacy way, i.e., REL-13 SC-PMT, of SC-MCCH change notification is modified. And because of this change, there will be associated overhead if the eMTC/NB-IoT UEs use the legacy way to obtained the changes of SC-MCCH.

According to embodiments herein, several difference ways of using one or maybe more fields in the DCIs are provided to better indicate the changes in SC-MCCH configurations. According to embodiments herein, the network, such as the network node 110 provides addition information in the DCIs together with SC-MCCH change notification to assist a UE such as the wireless device 120, to decide whether or not the change notification is relevant to the wireless device 120, and decides whether or not to read the entire new SC-MCCH. The previously mentioned DCIs may include the DCI used for the direct indication of SC-MCCH change notification, or DCIs which schedule the SC-MCCH and/or SC-MTCH payload.

Figure 3:
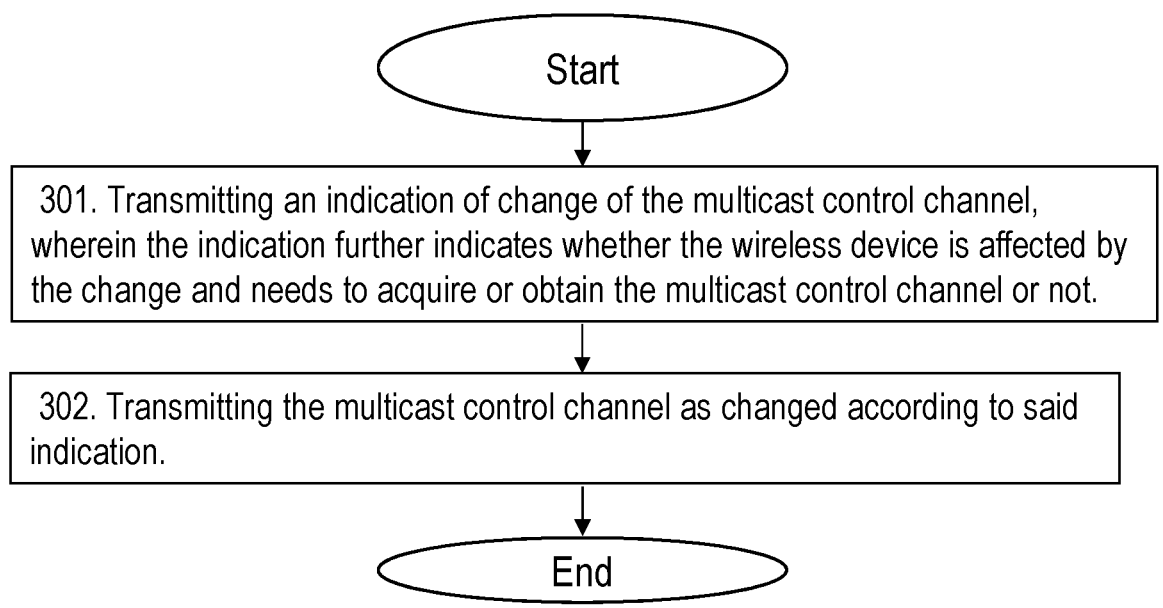
FIG. 3 is a flow chart illustrating a procedure in a network node, according to further possible embodiments.

A non-limiting example of how a network node may operate is illustrated by the flow chart in FIG. 3 which will now be described with further reference to FIG. 1 but without limitation to the communication scenario in FIG. 1. FIG. 3 thus illustrates a procedure in the network node, such as the network node 110, for enabling a wireless device, such as the wireless device 120, to obtain configuration information from a multicast control channel, e.g. the above-mentioned SC-MCCH, transmitted by the network node.

A first action 301 illustrates that the network node 200 transmits an indication of change of the multicast control channel, wherein the indication further indicates whether the wireless device is affected by the change and needs to acquire or obtain the multicast control channel or not. Some examples of how this indication may be transmitted will be presented below. The network node further transmits the multicast control channel as changed according to said indication, in an action 302. Thereby, it is an advantage that the wireless device can decide to obtain and acquire the multicast control channel only if it is affected by the change and to refrain when not affected, which will reduce energy consumption in the wireless device as explained above.

Some optional and non-limiting embodiments of the above procedure in the network node will now be described. In one example embodiment, the indication may indicate whether a configuration of a multicast traffic channel, e.g. the above-mentioned SC-MTCH, used by the wireless device is changed. In another example embodiment, the indication may be transmitted by means of a Radio Network Temporary Identifier, RNTI.

In another example embodiment, the indication may be transmitted as information in Downlink Control Information, DCI, that is used to schedule different multicast traffic channels (SC-MTCHs), said information indicating whether a configuration of respective multicast traffic channels is changed or not. An example of how this embodiment may be employed will be described later with reference to FIG. 8. In this case, another example embodiment may be that said information indicates that a new service is established or that an old, i.e. current or existing, service is changed for the respective multicast traffic channels.

In another example embodiment, the indication is transmitted as information in Downlink Control Information, DCI, that is used to schedule payload in the multicast control channel (SC-MCCH), said information indicating whether a configuration of multicast traffic channels is changed or not. An example of how this embodiment may be employed will also be described later with reference to FIG. 9.

In another example embodiment, the indication may be transmitted as information in a direct indication message, said information indicating which multicast traffic channel configuration(s) is/are changed.

In a further example embodiment, the indication may indicate whether the change comprises at least one of: establishment of new multicast traffic channel configuration(s) and update of old, i.e. current or existing, multicast traffic channel configuration(s).

Figure 4:
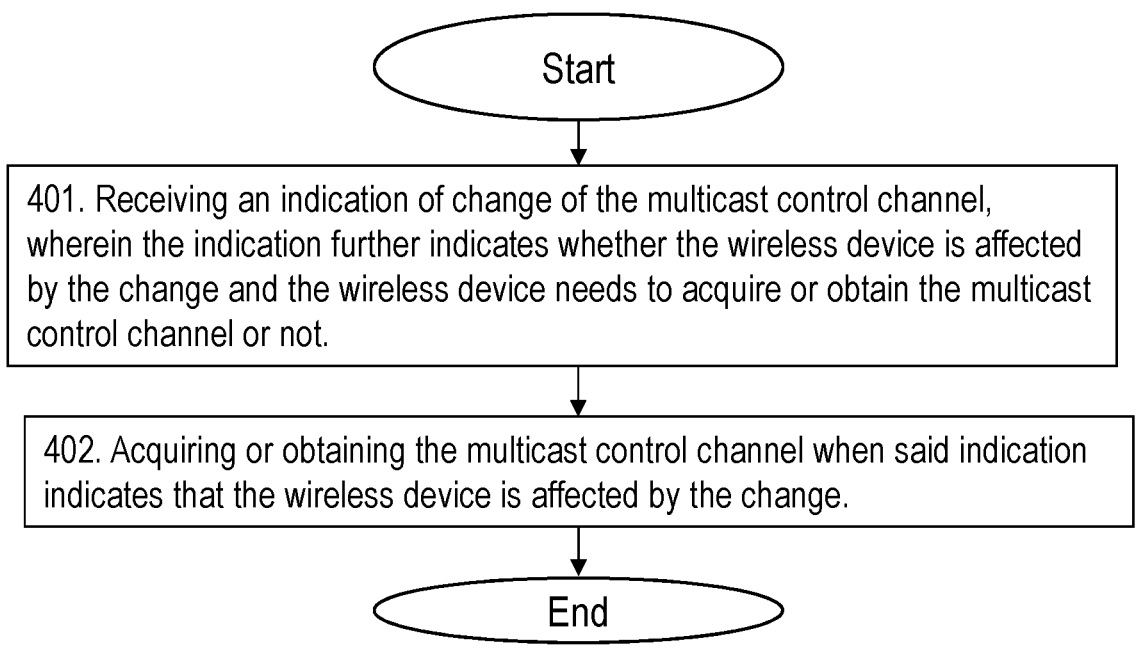
FIG. 4 is a flow chart illustrating a procedure in a wireless device, according to further possible embodiments.

Another non-limiting example of how a wireless device, such as the wireless device 120, may operate is further illustrated by the flow chart in FIG. 4 which will now be described likewise with further reference to FIG. 1. FIG. 4 thus illustrates a procedure in the wireless device 120 for obtaining configuration information from a multicast control channel (SC-MCCH) transmitted by a network node (110) in a wireless network.

A first action 401 illustrates that the wireless device 120 receives, from the network node, an indication of change of the multicast control channel, wherein the indication further indicates whether the wireless device is affected by the change and the wireless device needs to acquire or obtain the multicast control channel or not. This action corresponds to action 301 above. In a next action 402, the wireless device 120 acquires or obtains the multicast control channel when said indication indicates that the wireless device is affected by the change. Otherwise, the wireless device 120 does not need to acquire or obtain the multicast control channel which will save energy, i.e. battery, in the device which is an advantage as explained above.

Some optional and non-limiting embodiments of the above procedure in the network node will now be described. In one example embodiment, the indication may indicate whether a configuration of a multicast traffic channel (SC-MTCH) used by the wireless device is changed. In another example embodiment, the indication may be received by means of a Radio Network Temporary Identifier, RNTI.

In another example embodiment, the indication is received as information in Downlink Control Information, DCI, that is used to schedule different multicast traffic channels (SC-MTCHs), said information indicating whether a configuration of respective multicast traffic channels is changed or not. In another example embodiment, said information may in that case indicate that a new service is established or that an old, i.e. current or existing, service is changed for the respective multicast traffic channels.

In another example embodiment, the indication may be received as information in Downlink Control Information, DCI, that is used to schedule payload in the multicast control channel (SC-MCCH), said information indicating whether a configuration of multicast traffic channels is changed or not.

In another example embodiment, the indication may be received as information in a direct indication message, said information indicating which multicast traffic channel configuration(s) is/are changed.

In another example embodiment, the indication may indicate whether the change comprises at least one of: establishment of new multicast traffic channel configuration(s) and update of old, i.e. current or existing, multicast traffic channel configuration(s).

Figure 5:
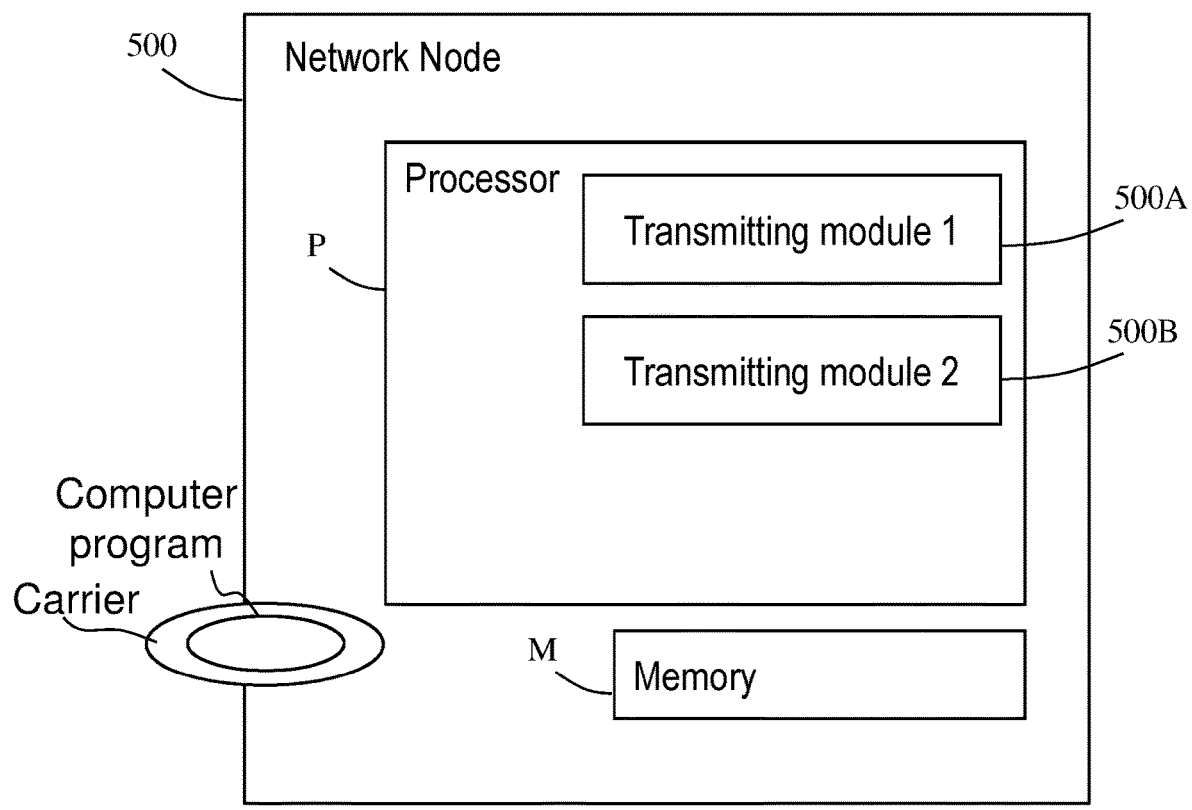
FIG. 5 is a block diagram illustrating an example of how a network node may be structured, according to further possible embodiments.
Figure 6:
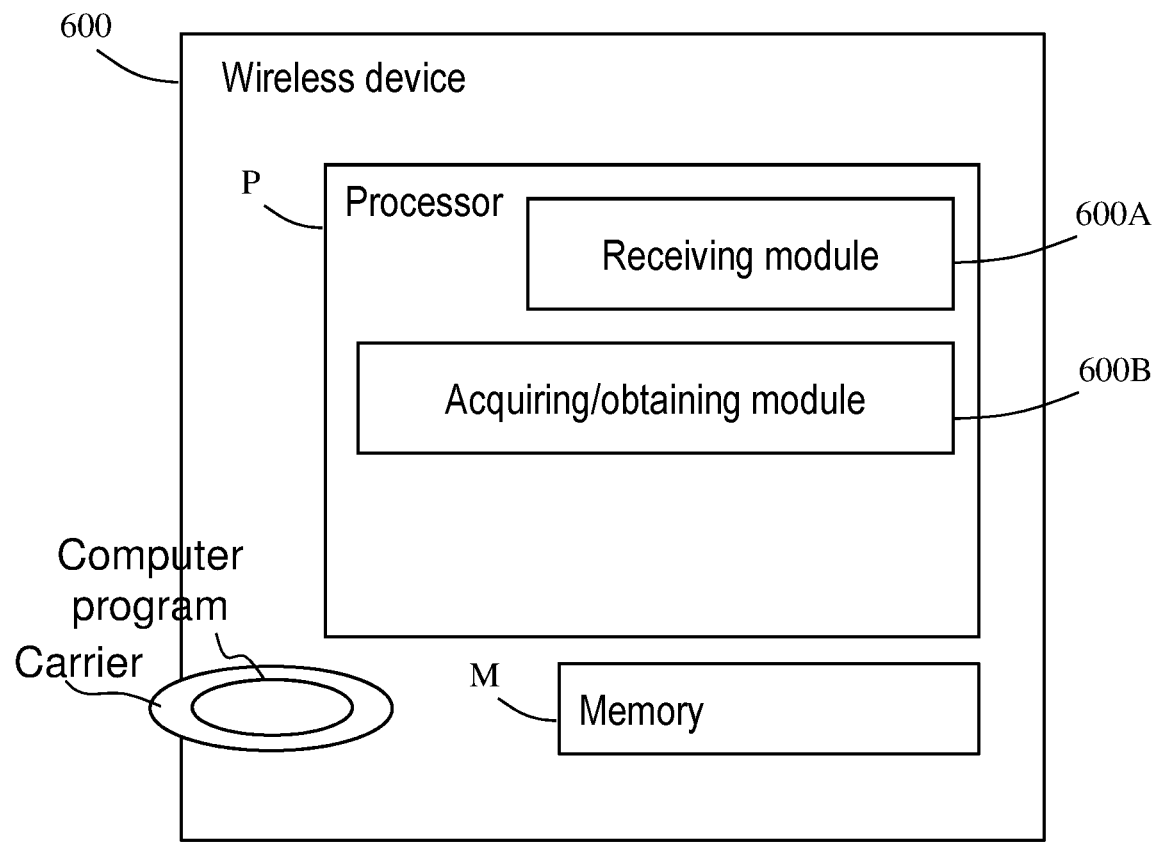
FIG. 6 is a block diagram illustrating an example of how a wireless device may be structured, according to further possible embodiments.

The block diagrams in FIGS. 5 and 6 illustrate how a network node 500 and a wireless device 600, respectively, may be structured to bring about the above-described solution and embodiments thereof. In these figures, the network node 500 and the wireless device 600 may be configured to operate according to any of the examples and embodiments of employing the solution as described herein, where appropriate, particularly in the manner described above for FIGS. 3 and 4, respectively. Each of the network node 500 and the wireless device 600 is shown to comprise a processor and a memory.

Each of the network node 500 and the wireless device 600 further comprises equipment configured for communication with each other using a suitable protocol for the communication depending on the implementation. The solution is however not limited to any specific types of radio signals or protocols.

The network node 500 is, e.g. by means of units, modules or the like, configured or arranged to perform the actions of the flow chart in FIG. 3 as follows. Further, the wireless device 600 is, e.g. by means of units, modules or the like, configured or arranged to perform the actions of the flow chart in FIG. 4 as follows.

With reference to FIG. 5, the network node 500 is arranged to enable a wireless device to obtain configuration information from a multicast control channel, e.g. the SC-MCCH, transmitted by the network node 500.

The network node 500 is configured to transmit an indication of change of the multicast control channel, wherein the indication further indicates whether the wireless device is affected by the change and needs to acquire or obtain the multicast control channel or not. This operation may be performed by a first transmitting module 500A in the network node 500 and as illustrated in action 301. The network node 500 is also configured to transmit the multicast control channel as changed according to said indication. This operation may be performed by a second transmitting module 500B in the network node 500 and as illustrated in action 302.

With reference to FIG. 6, the wireless device 600 is arranged to obtain configuration information from a multicast control channel, e.g. the SC-MCCH, transmitted by a network node in a wireless network.

The wireless device 600 is configured to receive, from the network node, an indication of change of the multicast control channel, wherein the indication further indicates whether the wireless device is affected by the change and the wireless device needs to acquire or obtain the multicast control channel or not. This operation may be performed by a receiving module 600A in the wireless device 600 and as illustrated in action 401.

The wireless device 600 is also configured to acquire or obtain the multicast control channel when said indication indicates that the wireless device is affected by the change. This operation may be performed by an acquiring/obtaining module 600B in the wireless device 600 and as illustrated in action 402.

It should be noted that FIGS. 5 and 6 illustrate various functional modules in the network node 500 and the wireless device 600, respectively, and the skilled person is able to implement these functional modules in practice using suitable software and hardware equipment. Thus, the solution is generally not limited to the shown structures of the network node 500 and the wireless device 600, and the functional modules therein may be configured to operate according to any of the features, examples and embodiments described in this disclosure, where appropriate.

The functional modules 500A-B and 600A-B described above may be implemented in the network node 500 and the wireless device 600, respectively, by means of program modules of a respective computer program comprising code means which, when run by the processor P causes the network node 500 and the wireless device 600 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 500 and the wireless device 600 in the form of a memory having a computer readable medium and being connected to the processor P. The computer program product or memory M in each of the network node 500 and the wireless device 600 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 500 and wireless device 600.

The solution described herein may be implemented in each of the network node 500 and the wireless device 600 by a computer program comprising instructions which, when executed on at least one processor, cause the at least one processor to carry out the actions according to any of the above embodiments and examples, where appropriate. The solution may also be implemented at each of the network node 500 and the wireless device 600 in a carrier containing the above computer program, as shown in the figures, wherein the carrier is one of an electronic signal, optical signal, radio signal, or computer readable storage medium.

Some further examples of how the embodiments herein may be implemented will now be described in terms of four possible implementations 1-4 which are related to at least some of the above-described embodiments. Note that the multicast control channels used in the examples below are exemplified with the SC-MCCH, however, also other types of multicast control channels may be used in the embodiments herein. Furthermore, multicast traffic channels used in the examples below are exemplified with the SC-MTCH, however, also other types of multicast traffic channels may be used in the embodiments herein.

First Implementation

This implementation refers to the above embodiment where the indication is transmitted as information in a DCI that is used to schedule different multicast traffic channels e.g. SC-MTCHs, said information indicating whether a configuration of respective multicast traffic channels is changed or not.

It is agreed in "*DRAFT Report from the IoT breakout sessions,* 3*GPP RAN2 Meeting #95bis, Kaohsiung, Taiwan, Oct.* 10-14, 2016" that "RAN2 assumes that direct Indication or similar mechanism (that provides information in DCI) can be used for SC-MCCH change notification." Therefore, at the time when the network indicates the change of SC-MCCH, it may also include necessary information in the DCIs that schedules different SC-MTCHs, and also indicates whether the configuration of a particular SC-MTCH is changed.

In more detail, each SC-MTCH payload transmission on the common shared data channel is scheduled by an SC-MTCH control channel carrying a DCI. As mentioned above, for eMTC a DCI is carried by MPDCCH and for NB-IoT a DCI is carried by NPDCCH. Therefore, upon receiving or detecting an SC-MCCH change notification, the network node 110 may indicate in a SC-MTCH DCI whether the configuration of the corresponding SC-MTCH is going to be changed or not. If the DCI indicates the configuration of this SC-MTCH is going to be changed, the UE such as the wireless device 120 will go and read the updated SC-MCCH. Otherwise, the UE can still assume that the previous configuration is valid. For example, see FIG. 2, in the DCI for SC-MTCH 1, if this DCI indicates the configuration of SC-MTCH 1 is not changed, then UEs such as the wireless device 120 that are currently listening to SC-MTCH 1 do not need to read the updated SC-MCCH, and vice versa.

Furthermore, the network node 110 may indicate in the DCIs whether the change of SC-MCCH includes to add in new services rather than change of old services. DCIs here means different DCIs that schedules different SC-MTCHs. In this case, the UEs such as the wireless device 120 that have interests in new services can go and read the updated SC-MCCH, and the ones that are not interested can assume that their current SC-MTCH(s)' configuration(s) are not changed.

An example of how the first implementation may be realized in practice will be described later with reference to FIG. 8.

Second Implementation

This implementation refers to the above embodiment where the indication is transmitted as information in a DCI that is used to schedule payload in the multicast control channel e.g. SC-MCCH, said information indicating whether a configuration of multicast traffic channels is changed or not. This is similar to the first implementation, but instead of indicating the SC-MTCH change in DCIs that schedule different SC-MTCHs, the change information may thus be provided in the DCI that schedules the SC-MCCH payload.

The DCI that schedules the SC-MCCH payload may indicate that the change of SC-MCCH is related to whether the configurations of some specific SC-MTCHs are changed. And UEs such as e.g. the wireless device 120 that are affected will thereby proceed to read the updated SC-MCCH.

Further, in the DCI that schedules the SC-MCCH payload, the network node 110 may also indicate whether or not the change of SC-MCCH includes adding new services, e.g., new SC-MTCH configurations, or if it is an update of the old SC-MTCH configurations, or both. Then, if the change of SC-MCCH is just about adding in new services, a UE such as e.g. the wireless device 120 may assume its old SC-MTCH configurations are not changed. In this case, only if a UE that is interested in the newly added service it will go and read the SC-MCCH changes.

In one example of the second implementation, a bit field of length N in the DCI may be used to indicate, e.g. by using a bit map, which specific SC-MTCHs or MBMS services that have been changed. The UE such as e.g. the wireless device 120 listening to the corresponding changed SC-MTCH(s) may then re-acquire the SCPTMConfiguration message carried over SC-MCCH. In another example of the second implementation, there may be a field in the DCI which can be used to indicate whether there are new services or some existing services that have stopped in the updated configuration message, e.g. in case RAN2 introduces a means to indicate such to the UE such as e.g. the wireless device 120 via a MAC CE. It is also possible to combine the above two examples of the second Implementation so that there is one field or flag indicating new messages and another field indicating the specific changed configuration information.

Figure 9:
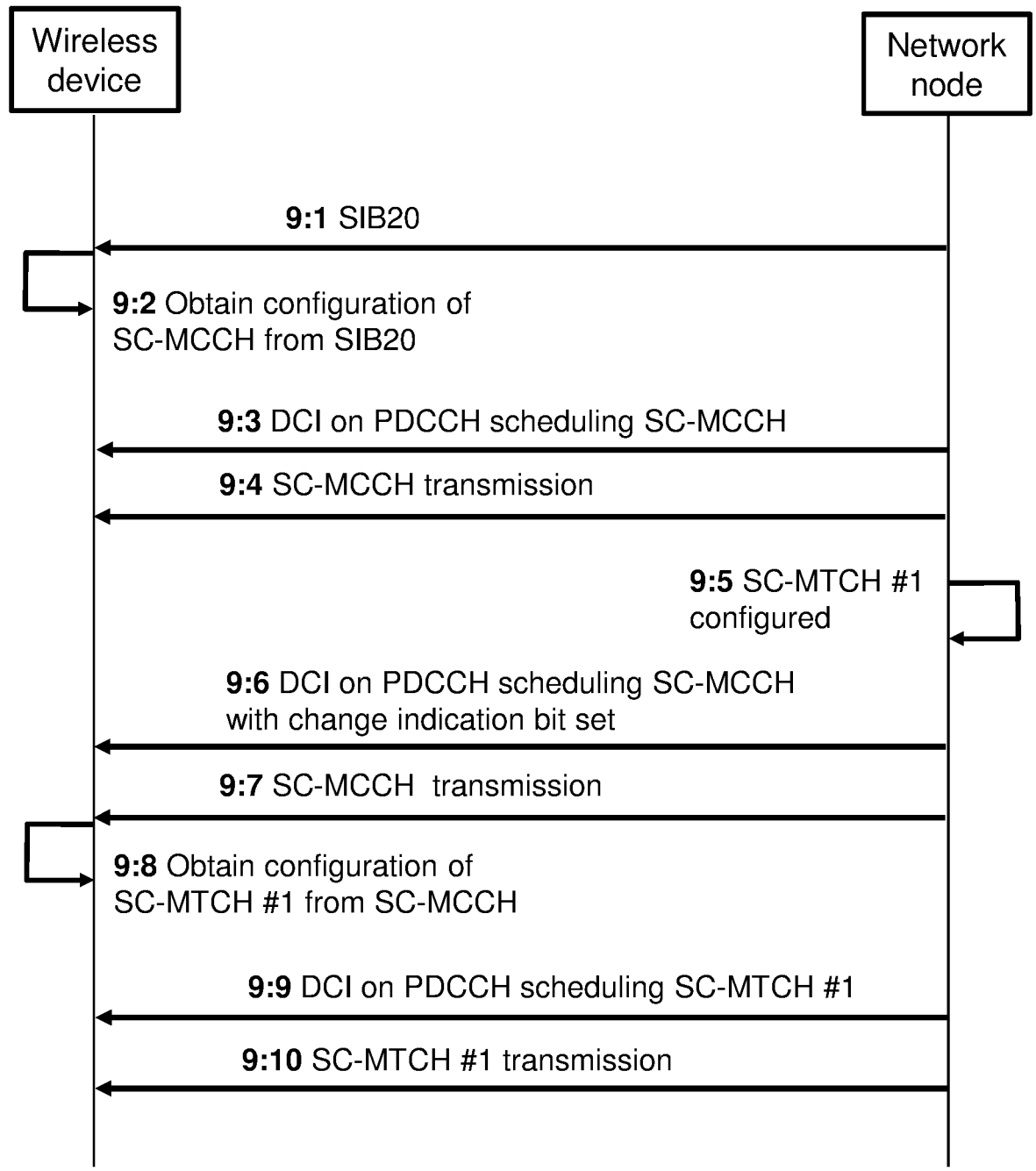
FIG. 9 is a signaling diagram illustrating another example of how a wireless device and a network node may operate when at least some of the embodiments herein are employed.

An example of how the second implementation may be realized in practice will be described later with reference to a signaling procedure which is illustrated in FIG. 9.

Third Implementation

This implementation refers to the above embodiment where the indication is transmitted as information in a direct indication message, said information indicating which multicast traffic channel configuration(s) is/are changed.

It is agreed in *DRAFT Report from the IoT breakout sessions,* 3*GPP RAN2 Meeting #95bis, Kaohsiung, Taiwan, Oct.* 10-14, 2016 that "RAN2 assumes that direct Indication or similar mechanism (that provides information in DCI) may be used for SC-MCCH change notification. Therefore, in the direct indication message, in addition to notifying that the SC-MCCH configuration will be changed, it is also possible to include information about which SC-MTCHs or MBMS services are affected by the change. In this way, upon receiving the change indication, a UE such as e.g. the wireless device 120 may decide whether to re-acquire the SC-MCCH or not.

Fourth Implementation

This implementation refers to the above embodiment where the indication indicates whether the change comprises at least one of: establishment of new multicast traffic channel configuration(s) and update of old, i.e. current or existing, multicast traffic channel configuration(s).

In some cases, the third Implementation may not be practicable, as, for example, indicating different services may mean increasing the indication size too much. If so, the fourth implementation may be used to simply indicate that the change of SC-MCCH includes to add new services, e.g., new SC-MCTCH configurations, or that it is an update of the old SC-MTCH configurations, or both. Then, if the change of SC-MCCH is just about adding in new services, a UE such as e.g. the wireless device 120 may assume that its old SC-MTCH configurations have not changed. In this case, only a UE such as e.g. the wireless device 120 that is interested in the newly added service will go and read the SC-MCCH changes.

In the case of just the addition of new services is indicated, then it is enough to use one additional field to indicate this addition of new services. Or a combination of several fields may be used for this purpose.

In addition, if the change of SC-MCCH is related to removing one or several ongoing services, this change can also be reflected in the same way as mentioned above. The UEs, such as e.g. the wireless device 120, that may have ongoing SC-MTCH(s) will go and read the SC-MCCH for the changes, but the UEs, such as e.g. the wireless device 120, that are only monitoring some SC-PTM service and have no ongoing SC-MTCH(s) do not need to go and read the SC-MCCH changes.

Figure 7:
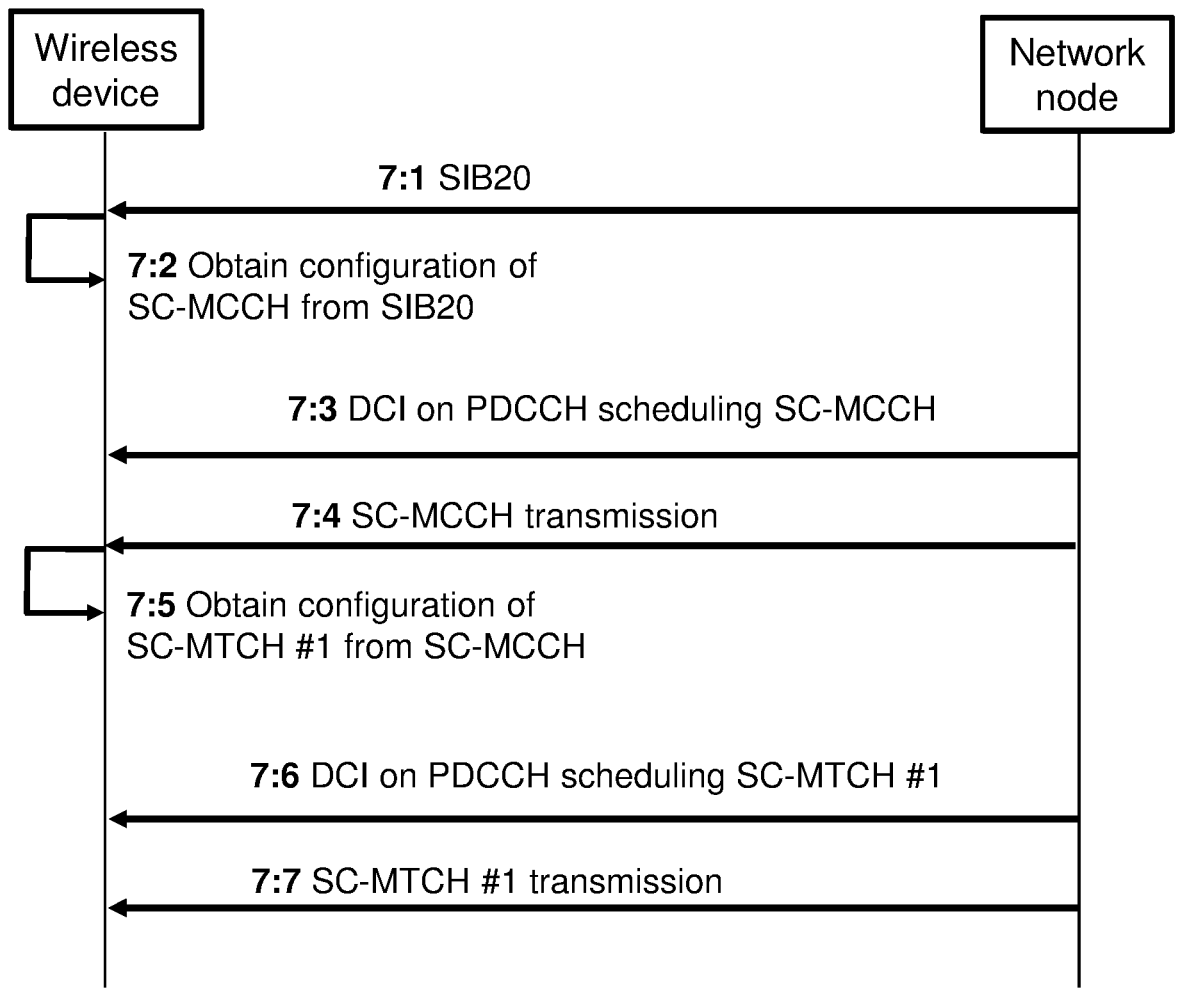
FIG. 7 is a signaling diagram illustrating an example of how a wireless device and a network node may operate when a regular or conventional procedure is employed.

Two examples of how the solution may be realized in practice will be described below with reference to the signaling diagrams in FIGS. 8 and 9. First, an example of a conventional procedure where the inventive indication is not used will be described with reference to the signaling diagram in FIG. 7 as a comparison. In this procedure it is assumed that the network node provides a particular service by transmitting payload on a multicast traffic channel "SC-MTCH #1", and that a wireless device is configured to employ the service by monitoring the SC-MTCH #1. The procedure includes the following course of actions:

Action 7:1—The network node periodically broadcasts a System Information Block called "SIB20" which contains a configuration of the multicast control channel SC-MCCH.

Action 7:2—The wireless device receives the SIB20 and obtains the configuration of SC-MCCH therefrom.

Action 7:3—The network node transmits a DCI on the PDCCH, which DCI schedules the network node's transmissions of the SC-MCCH. By receiving this DCI, the wireless device will know when to receive and monitor the SC-MCCH.

Action 7:4—The network node transmits the SC-MCCH according to the scheduling indicated in the DCI of action 7:3, which SC-MCCH is received by the wireless device.

Action 7:5—The wireless device obtains from the SC-MCCH a configuration of the specific SC-MTCH #1 which is thus of interest to the wireless device to employ the service.

Action 7:6—The network node transmits a DCI on the PDCCH, which DCI schedules the network node's transmissions of the SC-MTCH #1. Thereby, the wireless device will know when to receive the SC-MTCH #1.

Action 7:7—The network node transmits the SC-MTCH #1 according to the scheduling indicated in the DCI of action 7:6, which SC-MTCH #1 is received by the wireless device.

It should be noted that the wireless device needs to keep monitoring the SC-MCCH by repeating at least actions 7:3-7:5, in case there is any change of the configuration of the SC-MTCH #1, which consequently drains the wireless device's battery.

Figure 8:
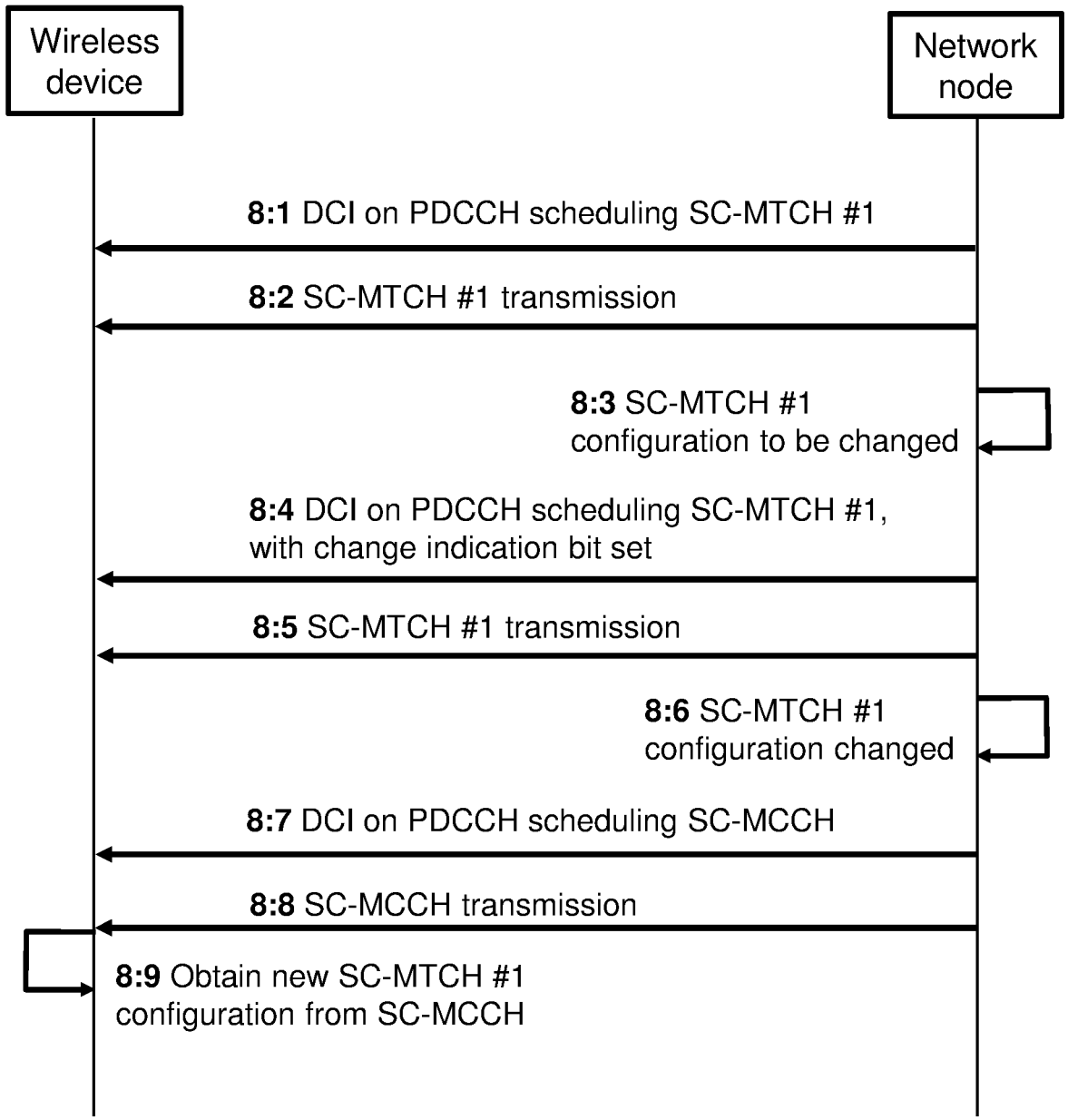
FIG. 8 is a signaling diagram illustrating an example of how a wireless device and a network node may operate when at least some of the embodiments herein are employed.

The signaling diagram in FIG. 8 illustrates an example of how the above-described "first implementation" may be realized in practice, which will now be described in terms of the following course of actions. In this implementation, the indication of change of the multicast control channel is thus transmitted as information in a DCI that is used to schedule different multicast traffic channels or SC-MTCHs, said information indicating whether a configuration of respective multicast traffic channels is changed or not.

In this procedure, it is again assumed that the network node provides a particular service by transmitting payload on the SC-MTCH #1, and that the wireless device is configured to receive and monitor the SC-MTCH #1 to employ the service. It is also assumed that the wireless device has obtained a configuration of the SC-MTCH #1, e.g. as described above for FIG. 7. The procedure of FIG. 8 is as follows:

Action 8:1—The network node transmits a DCI on the PDCCH, which DCI schedules the network node's transmissions of the SC-MTCH #1. Thereby, the wireless device will know when to receive the SC-MTCH #1.

Action 8:2—The network node transmits the SC-MTCH #1 according to the scheduling indicated in the DCI of action 8:1, which SC-MTCH #1 is received by the wireless device. These first two actions correspond to actions 7:6 and 7:7 in the above conventional procedure which may be repeated until the next actions occur.

Action 8:3—The network node finds out that the configuration of SC-MTCH #1 will be changed which means that the SC-MCCH will also be changed accordingly.

Action 8:4—The network node transmits a DCI on the PDCCH, which DCI schedules the network node's transmissions of the SC-MTCH #1. In this case, the DCI also contains an indication of change of the configuration of SC-MTCH #1 in the SC-MCCH which configuration will be valid in a forthcoming next modification period, e.g. by setting a change indication bit in the DCI for that SC-MTCH #1. Thereby, the wireless device will know that it is affected by the SC-MCCH change and therefore needs to read the SC-MCCH again in the next modification period.

Action 8:5—The network node transmits the SC-MTCH #1 with the "old" configuration of SC-MTCH #1 which has thus not yet changed, and the wireless device is thereby able to obtain this SC-MTCH #1 transmission with the old configuration.

Action 8:6—The network node now changes the configuration of SC-MTCH #1 which means that the SC-MCCH is also changed accordingly.

Action 8:7—The network node transmits a DCI on the PDCCH, which DCI schedules the network node's transmissions of the SC-MCCH, as in action 7:3. By receiving this DCI, the wireless device will know when to monitor the SC-MCCH and can thereby obtain the changed configuration of SC-MTCH #1 as follows.

Action 8:8—The network node transmits the SC-MCCH according to the scheduling indicated in the DCI of action 8:7, which SC-MCCH is received by the wireless device, as in action 7:4.

Action 8:9—The wireless device obtains from the SC-MCCH the new, i.e. changed, configuration of the SC-MTCH #1. Thereby, the wireless device is able to receive and use the SC-MTCH #1 when transmitted from the network node.

It should be noted that in this case the wireless device does not need to monitor the SC-MCCH unless a change of the configuration of the SC-MTCH #1 is indicated in the DCI for SC-MTCH #1 of action 8:4, which thereby reduces the wireless device's energy consumption.

The signaling diagram in FIG. 9 illustrates an example of how the above-described "second implementation" may be realized in practice, which will now be described in terms of the following course of actions. In this implementation, the indication of change of the multicast control channel is thus transmitted as information in a DCI that is used to schedule payload in the multicast control channel or SC-MCCH, said information indicating whether a configuration of multicast traffic channels is changed or not.

When this procedure starts, it is assumed that the network node does not yet provide a service by transmitting payload on the SC-MTCH #1, and that the wireless device is configured to receive and monitor the SC-MTCH #1 to employ the service once it becomes available. The procedure of FIG. 9 is as follows:

Action 9:1—The network node periodically broadcasts a System Information Block called "SIB20" which contains a configuration of the multicast control channel SC-MCCH.

Action 9:2—The wireless device receives the SIB20 and obtains the configuration of SC-MCCH therefrom.

Action 9:3—The network node transmits a DCI on the PDCCH, which DCI schedules the network node's transmissions of the SC-MCCH. By receiving this DCI, the wireless device will know when to monitor the SC-MCCH.

Action 9:4—The network node transmits the SC-MCCH according to the scheduling indicated in the DCI of action 7:3, which SC-MCCH is received by the wireless device. So far, actions 9:1-9:4 correspond to actions 7:1-7:4 in the conventional procedure of FIG. 7.

Action 9:5—The network node finds out that a configuration of SC-MTCH #1 is created for the service, which means that the SC-MCCH will also be changed accordingly.

Action 9:6—The network node transmits a DCI on the PDCCH, which DCI schedules the network node's transmissions of the SC-MCCH. In this case, the DCI also contains an indication of the created configuration of SC-MTCH #1 in the SC-MCCH, e.g. by setting a change indication bit in the DCI for that SC-MTCH #1. Thereby, the wireless device will know that it is affected by the SC-MCCH change and therefore needs to read the SC-MCCH to obtain the configuration of SC-MTCH #1.

Action 9:7—The network node transmits the SC-MCCH according to the scheduling indicated in the DCI of action 9:6, which SC-MCCH is received by the wireless device.

Action 9:8—The wireless device obtains from the SC-MCCH the configuration of the SC-MTCH #1. Thereby, the wireless device is able to receive and use the SC-MTCH #1 when transmitted from the network node.

Action 9:9—The network node transmits a DCI on the PDCCH, which DCI schedules the network node's transmissions of the SC-MTCH #1. Thereby, the wireless device will know when to receive the SC-MTCH #1.

Action 9:10—The network node transmits the SC-MTCH #1 according to the scheduling indicated in the DCI of action 7:6, which SC-MTCH #1 is received by the wireless device.

It should be noted that in this case the wireless device does not need to monitor the SC-MCCH unless the DCI for the SC-MCCH of action 9:6 indicates that the configuration of the SC-MTCH #1 is available, which thereby reduces the wireless device's energy consumption.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "Number", "value" may also be represented by a bit string.

As used herein, the expression "in some embodiments" has been used to indicate that the features of the embodiment described may be combined with any other embodiment disclosed herein.

When using the word "comprise" or "comprising" it shall be interpreted as non-limiting, i.e. meaning "consist at least of".

ABBREVIATION EXPLANATION

DCI Downlink Control Information
NB Narrow band
NB-IoT Narrowband Internet of Things
MTC Machine Type Communications
LTE Long Term Evolution
PDCCH Physical Data Control Channel
NB-PBCH NB-IoT Physical Broadcast Channel
PRB Physical Resource Block
DL Downlink UL Uplink
RRC Radio Resource Control
SC-MCCH Single-cell multicast control channel
SC-MTCH Single-cell multicast traffic channel
RNTI Radio Network Temporary Identifier
MBMS Multimedia Broadcast Multicast Services
MAC Medium Access Control While the solution has been described with reference to specific exemplifying embodiments, the description is generally only intended to illustrate the inventive concept and should not be taken as limiting the scope of the solution. For example, the terms "network node", "wireless device", "indication of change", "multicast control channel" and "multicast traffic channel" have been used throughout this disclosure, although any other corresponding entities, functions, and/or parameters could also be used having the features and characteristics described here. The solution may be implemented according to the appended claims which contain references in parenthesis to corresponding actions in FIGS. 3 and 4 and to corresponding modules in FIGS. 5 and 6.

The invention claimed is:

1. A method performed by a network node in a wireless network, the method comprising:
transmitting an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and
transmitting the multicast control channel as changed according to the indication.

2. The method according to claim 1, wherein the indication is transmitted by means of a Radio Network Temporary Identifier (RNTI).

3. The method according to claim 1, wherein the indication is transmitted as information in Downlink Control Information (DCI) that is used to schedule different multicast traffic channels.

4. The method according to claim 1, wherein the indication is transmitted as information in Downlink Control Information (DCI) that is used to schedule payload in the multicast control channel.

5. A network node comprising:
communication circuitry configured for communicating with the wireless device; and
processing circuitry operatively associated with the communication circuitry and configured to:
transmit an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and
transmit the multicast control channel as changed according to the indication.

6. The network node according to claim 5, wherein the processing circuitry is configured to transmit the indication by means of a Radio Network Temporary Identifier (RNTI).

7. The network node according to claim 5, wherein the processing circuitry is configured to transmit the indication as information in Downlink Control Information (DCI) that is used to schedule different multicast traffic channels.

8. The network node according to claim 5, wherein the processing circuitry is configured to transmit the indication as information in Downlink Control Information (DCI) that is used to schedule payload in the multicast control channel.

9. The network node according to claim 5, wherein the processing circuitry is configured to transmit the indication as information in a direct indication message.

10. A method performed by a wireless device configured to communicate with a network node in a wireless network, the method comprising:
receiving an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and
reading the multicast control channel responsive to determining that the changed configuration information affects multicast-service reception by the wireless device.

11. The method according to claim 10, wherein determining that the changed configuration information affects multicast-service reception by the wireless device comprises determining that the changed configuration information involves an existing multicast service being received by the wireless device or a new multicast service to be received by the wireless device.

12. The method according to claim 10, wherein the indication is received by means of a Radio Network Temporary Identifier (RNTI).

13. The method according to claim 10, wherein the indication is received as information in Downlink Control Information (DCI) that is used to schedule different multicast traffic channels.

14. The method according to claim 13, further comprising, subsequent to reading the multicast control channel, applying the changed configuration information for multicast-service reception in the next modification period.

15. The method according to claim 10, wherein the indication is received as information in Downlink Control Information (DCI) that is used to schedule payload in the multicast control channel.

16. The method according to claim 10, wherein the indication is received as information in a direct indication message.

17. A wireless device configured to communicate with a network node in a wireless network, wherein the wireless device comprises:

communication circuitry configured for communicating with the network node; and processing circuitry operatively associated with the communication circuitry and configured to:

receive an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and reading the multicast control channel responsive to determining that the changed configuration information affects multicast-service reception by the wireless device.

18. The wireless device according to claim 17, wherein the processing circuitry is configured to determine that the changed configuration information affects multicast-service reception by the wireless device by determining that the changed configuration information involves an existing multicast service being received by the wireless device or a new multicast service to be received by the wireless device.

19. The wireless device according to claim 17, wherein the processing circuitry is configured to receive the indication by means of a Radio Network Temporary Identifier (RNTI).

20. The wireless device according to claim 17, wherein the processing circuitry is configured to receive the indication as information in Downlink Control Information (DCI) that is used to schedule different multicast traffic channels.

21. The wireless device according to claim 20, wherein, subsequent to reading the multicast control channel, the processing circuitry is configured to apply the changed configuration information for multicast-service reception in the next modification period.

22. The wireless device according to claim 17, wherein the processing circuitry is configured to receive the indication as information in Downlink Control Information (DCI) that is used to schedule payload in the multicast control channel.

23. The wireless device according to claim 17, wherein the processing circuitry is configured to receive the indication as information in a direct indication message.

24. A non-transitory computer readable medium storing a computer program comprising instructions that, when executed on at least one processor of a network node of a wireless network, cause the network node to:

transmit an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and transmit the multicast control channel as changed according to the indication.

25. A non-transitory computer readable medium storing a computer program comprising instructions that, when executed on at least one processor of a wireless device configured for communicating with a network node of a wireless network, cause the wireless device to:

receive an indication of changed configuration information for a multicast control channel used to convey multicast traffic channel configurations for multicast traffic channels used by the network node to provide multicast services, the indication comprising a bitmap having bit positions corresponding to existing multicast services provided by the network node, wherein the state of the bit in each bit position indicates whether the traffic channel configuration of the corresponding existing multicast service will change in a next modification period, the bitmap further comprising a second bit indicating whether a new multicast service will start in the next modification period; and read the multicast control channel responsive to determining that the changed configuration information affects multicast-service reception by the wireless device.

* * * * *

UNITED STATES PATENT AND TRADEMARK OFFICE
CERTIFICATE OF CORRECTION

PATENT NO. : 11,350,347 B2
APPLICATION NO. : 15/759538
DATED : May 31, 2022
INVENTOR(S) : Yavuz et al.

It is certified that error appears in the above-identified patent and that said Letters Patent is hereby corrected as shown below:

In the Specification

In Column 3, Lines 42-43, delete "NB-1° T"," and insert -- NB-IoT", --, therefor.

In Column 4, Line 6, delete "due the" and insert -- due to the --, therefor.

In Column 4, Line 28, delete "NB-1° T" and insert -- NB-IoT --, therefor.

In Column 7, Line 42, delete "SC-MPTCH" and insert -- SC-MTCH --, therefor.

In Column 13, Line 22, delete "SC-MCTCH" and insert -- SC-MTCH --, therefor.

In the Claims

In Column 17, Line 54, in Claim 5, delete "the wireless device;" and insert -- a wireless device; --, therefor.

Signed and Sealed this
Seventh Day of February, 2023

Katherine Kelly Vidal
*Director of the United States Patent and Trademark Office*